United States Patent
Lee

(10) Patent No.: US 9,730,237 B1
(45) Date of Patent: Aug. 8, 2017

(54) WIRELESS DEVICE AND RANDOM ACCESS METHOD THEREOF FOR MOBILE COMMUNICATION SYSTEM

(71) Applicant: Institute For Information Industry, Taipei (TW)

(72) Inventor: Kun-Hung Lee, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/367,724

(22) Filed: Dec. 2, 2016

(30) Foreign Application Priority Data

Nov. 28, 2016 (TW) .............................. 105139076 A

(51) Int. Cl.
| | | |
|---|---|---|
| *H04W 72/00* | (2009.01) | |
| *H04W 72/10* | (2009.01) | |
| *H04W 74/08* | (2009.01) | |
| *H04W 28/04* | (2009.01) | |
| *H04L 12/26* | (2006.01) | |
| *H04W 88/08* | (2009.01) | |
| *H04W 88/02* | (2009.01) | |

(52) U.S. Cl.
CPC ............. *H04W 72/10* (2013.01); *H04L 43/16* (2013.01); *H04W 28/046* (2013.01); *H04W 74/0833* (2013.01); *H04W 88/02* (2013.01); *H04W 88/08* (2013.01)

(58) Field of Classification Search
CPC ......... H04W 74/0833; H04W 74/0866; H04W 74/002; H04W 74/006; H04W 74/008; H04W 16/24; H04W 72/04; H04W 74/00

USPC ........ 455/418, 424, 434, 450; 370/329, 431, 370/436
See application file for complete search history.

(56) References Cited

U.S. PATENT DOCUMENTS

| | | | | |
|---|---|---|---|---|
| 6,778,835 | B2* | 8/2004 | You ..................... | H04J 13/0044 370/329 |
| 2004/0014452 | A1* | 1/2004 | Lim ................... | H04B 7/18558 455/403 |
| 2008/0207196 | A1* | 8/2008 | Pettersson ............. | H04W 24/00 455/424 |
| 2009/0042582 | A1* | 2/2009 | Wang ................ | H04W 74/0866 455/450 |
| 2013/0021997 | A1* | 1/2013 | Lee ................... | H04W 74/0841 370/329 |
| 2015/0334748 | A1* | 11/2015 | Yu ......................... | H04L 1/1812 370/328 |
| 2016/0338114 | A1* | 11/2016 | Shimizu ............ | H04W 74/0841 |

(Continued)

*Primary Examiner* — Joseph Arevalo
(74) *Attorney, Agent, or Firm* — Skaar Ulbrich Macari, P.A.

(57) ABSTRACT

A wireless device and a random access method thereof for a mobile communication system are provided. The mobile communication system defines a plurality of preambles. The wireless device receives a system message carrying a random access success rate from a base station, and divides the preambles into N preamble subsets according to the random access success rate. The N preamble subsets have a strict partial order relationship therebetween. The union of the N preamble subsets consists of the preambles. When requesting random access from the base station, the wireless device randomly selects a preamble from the smallest preamble subset. When a preamble collision occurs, the wireless device reselects a preamble from the larger preamble subset gradually for the random access.

20 Claims, 4 Drawing Sheets

(56) References Cited

U.S. PATENT DOCUMENTS

2017/0006639 A1\* 1/2017 Shimizu ............ H04W 74/0833
2017/0013443 A1\* 1/2017 Gopalakrishnan .... H04W 8/186

\* cited by examiner

WIRELESS DEVICE AND RANDOM ACCESS METHOD THEREOF FOR MOBILE COMMUNICATION SYSTEM

PRIORITY

This application claims priority to Taiwan Patent Application No. 105139076 filed on Nov. 28, 2016, which is hereby incorporated by reference in its entirety.

FIELD

The present invention relates to a wireless device and a random access method thereof for a mobile communication system. More particularly, the wireless device of the present invention receives a system message carrying a random access success rate from a base station and divides a plurality of preamble subsets of the mobile communication system into N preamble subsets having a strict partial order relationship therebetween according to the random access success rate so that the wireless device selects a preamble from the larger preamble subset gradually for the random access in response to preamble collision when the wireless device requests a random access to the base station.

BACKGROUND

With the rapid development of the wireless communication technology, people's demand for the communication through the user equipments (UEs) (e.g., smart phones, tablet computers or the like) also increase. To satisfy the requirements of the users, new generations of mobile communication systems are being developed continuously, e.g., Long Term Evolution (LTE) communication systems, Worldwide Interoperability for Microwave Access (Wi-MAX) communication systems or the like.

When a user equipment (UE) is powered on, suffers a network disconnection or fails to synchronize with a base station in these mobile communication systems, a random access procedure may be initiated by the UE to obtain radio resources for subsequent data transmission with the base station. In the random access procedure, the UE transmits a random access request message on a particular channel broadcasted by the base station. The UE randomly selects one of a plurality of preambles defined by the communication system to generate a random access request message based on the selected preamble.

However, in addition to the common UEs, more and more kinds of wireless devices capable of mobile communication have been produced in recent years, e.g., Internet of Things (IoT) devices, Machine Type Communication (MTC) wireless devices or the like. When a large number of wireless devices (i.e., UEs, IoT devices, MTC devices and various kinds of wireless devices capable of mobile communication) initiate the random access procedure at the same time, each of these wireless devices selects a preamble randomly from the plurality of preambles of the same set. Therefore, it is likely that a same preamble is selected by multiple wireless devices at the same time to cause preamble collision between random access request messages transmitted by the wireless devices.

As the probability of preamble collision increases with the number of the wireless devices, the wireless device will re-select a preamble randomly to transmit a random access request message once the preamble collision occurs in the random access procedure. The operations of re-selecting a preamble randomly and transmitting the random access request message prolongs the time required for successfully accomplishing the random access procedure, and the wireless device even stops the random access procedure when the number of retransmission of the random access request message reaches an upper limit of the system. This causes failure of the data transmission between the wireless device and the base station, and moreover, leads to idleness of some radio resources of the base station.

Further, different wireless devices have different needs for data transmission. For example, UEs usually need real-time data transmission, while some IoT devices and MTC devices do not need real-time data transmission. Therefore, serious preamble collision may cause failure of the UEs to obtain resources for real-time data transmission, which results in a poor experience of the user.

Accordingly, an urgent need exists in the art to provide a random access mechanism that, despite of the increasing number of wireless devices, improves the probability of successfully executing the random access procedure by the wireless devices and especially UEs that need real-time data transmission so as to avoid idleness of the radio resources of the base station.

SUMMARY

The disclosure includes a random access mechanism for a mobile communication system. The random access mechanism can comprise, a system message carrying a random access success rate is transmitted from a base station, and the wireless device divides a plurality of preambles defined by the mobile communication system into a plurality of preamble subsets having a strict partial order relationship therebetween according to the random access success rate. Then in the random access procedure, the wireless device randomly selects a preamble to be used in the random access procedure from a larger preamble subset gradually in response to the preamble collision.

The disclosure also includes a wireless device for a mobile communication system. The mobile communication system defines a plurality of preambles. The wireless device can comprise a transceiver, a storage and a processor. The storage is configured to store the preambles. The processor is electrically connected to the transceiver and the storage, and is configured to receive a system message carrying a random access success rate from a base station via the transceiver and divide the preambles into N preamble subsets according to the random access success rate. Each of the N preamble subsets includes a part of the preambles. An $i^{th}$ preamble subset includes an $(i-1)^{th}$ preamble subset, where i is a positive integer from 2 to N. The union of the N preamble subsets consists of the preambles. The processor further executes the following steps of: (p1) randomly selecting a preamble from a $j^{th}$ preamble subset, where an initial value of j is 1; (p2) generating a random access request message according to the selected preamble; (p3) transmitting the random access request message to the base station via the transceiver; (p4) when a random access response message is not received from the base station via the transceiver within a preset time, determining whether j is equal to N, and setting j=j+1 if j is not equal to N; and (p5) repeating the steps (p1) to (p4) after the step (p4) until the random access response message is received from the base station or until a number of transmission of the random access request message reaches a threshold value.

Further, the disclosure includes a random access method for a wireless device. The wireless device is used in a mobile communication system. The mobile communication system defines a plurality of preambles. The wireless device can comprise a transceiver, a storage and a processor. The storage stores the preambles. The random access method is executed by the processor and comprises the following steps of: (a) receiving a system message carrying a random access success rate from a base station via the transceiver; (b) dividing the preambles into N preamble subsets according to the random access success rate, each of the N preamble subsets including a part of the preambles, an $i^{th}$ preamble subset including an $(i-1)^{th}$ preamble subset, where i is a positive integer from 2 to N, and the union of the N preamble subsets consists of the preambles; (p1) randomly selecting a preamble from a $j^{th}$ preamble subset, where an initial value of j is 1; (p2) generating a random access request message according to the selected preamble; (p3) transmitting the random access request message to the base station via the transceiver; (p4) when a random access response message is not received from the base station via the transceiver within a preset time, determining whether j is equal to N, and setting j=j+1 if j is not equal to N; and (p5) repeating the steps (p1) to (p4) after the step (p4) until the random access response message is received from the base station or until a number of transmission of the random access request message reaches a threshold value.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. It shall be appreciated that, these example embodiments are not intended to limit the present invention to any particular examples, embodiments, environment, applications or implementations described in these example embodiments. Therefore, description of these example embodiments is only for purpose of illustration rather than to limit the present invention, and the scope claimed in this application shall be governed by the claims. Besides, in the following embodiments and the attached drawings, elements unrelated to the present invention are omitted from depiction; and dimensional relationships among individual elements in the attached drawings are illustrated only for ease of understanding, but not to limit the actual scale.

Figure 1:
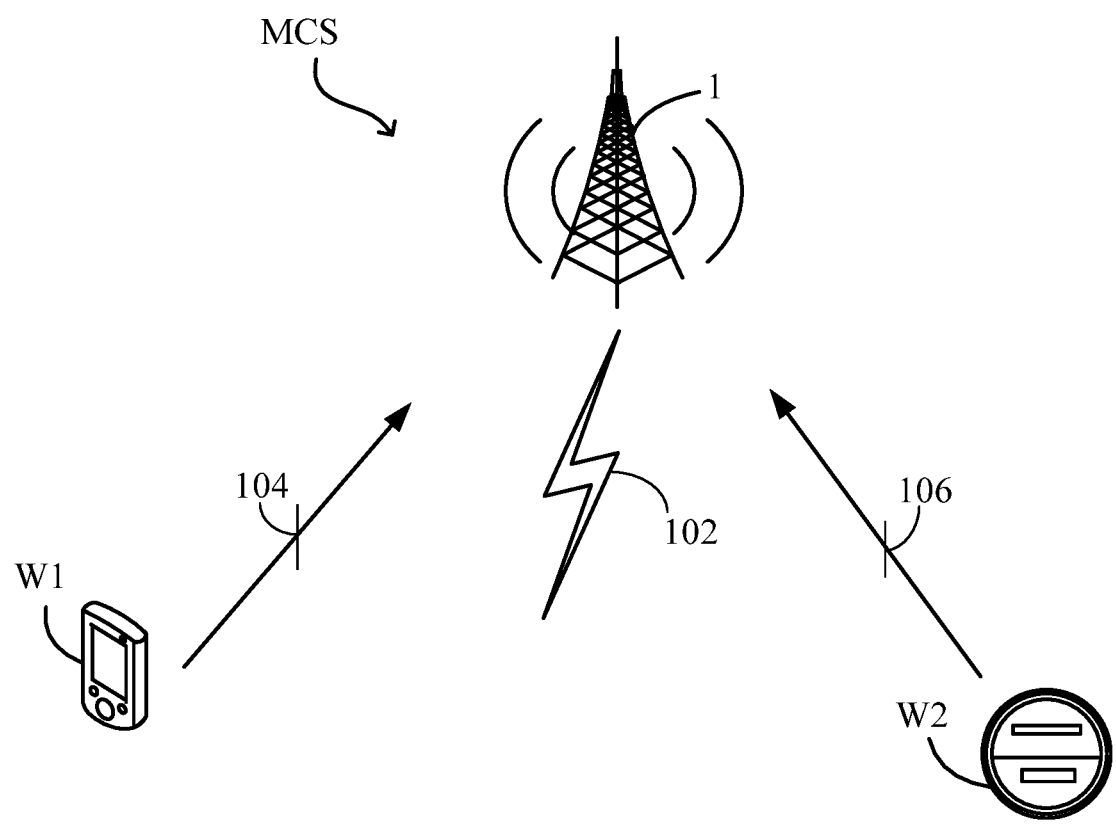
FIG. 1 is a schematic view illustrating signal transmission between a user equipment W1 and a smart meter W2 and a base station 1 in a mobile communication system MCS of the present invention.
Figure 2:
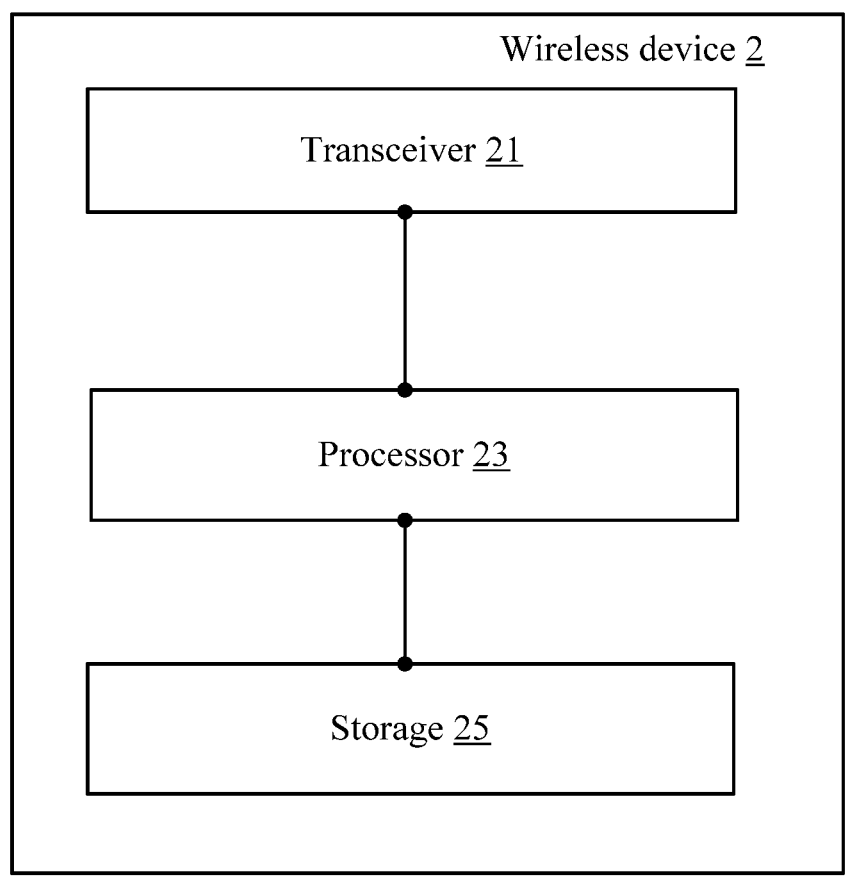
FIG. 2 is a schematic view of a wireless device 2 of the present invention.

Please refer to FIG. 1 and FIG. 2 for a first embodiment of the present invention. FIG. 1 is a schematic view depicting signal transmission between a base station 1 and a plurality of wireless devices (i.e., a user equipment W1 and a smart meter W2) in a mobile communication system MCS. The user equipment W1 may be a smart phone, a tablet computer or any mobile communication device. The smart meter W2 is a wireless device having the communication function in the mobile communication system MCS, and is usually fixedly mounted on a building to report electricity consumption information. It shall be appreciated that, the wireless devices of the present invention only need to have the communication function in the mobile communication system MCS, and are not limited to the aforesaid user equipment W1 and the smart meter W2.

The mobile communication system MCS may be any of mobile communication systems that perform the random access procedure based on a preamble, e.g., a Long Term Evolution (LTE) communication system or a Worldwide Interoperability for Microwave Access (WiMAX) communication system. The mobile communication system MCS defines a plurality of preambles. Taking an LTE communication system as an example, the LTE communication system defines 64 preambles, and the preambles may be generated based on a Zadoff-Chu sequence. The number of preambles in various mobile communication systems and the way to generate the preambles are known to those of ordinary skill in the art, so this will not be further described herein.

FIG. 2 is a schematic view of a wireless device 2 of the present invention. The wireless device 2 is a wireless device having a communication function in the mobile communication system MCS, e.g., one of the UE W1 and the smart meter W2. As described above, the mobile communication device MCS defines a plurality of preambles. The wireless device 2 comprises a transceiver 21, a processor 23 and a storage 25. The storage 25 stores the preambles. The wireless device 2 receives a system message 102 carrying a random access success rate from the base station 1 when the wireless device 2 is powered on or during operation.

It shall be appreciated that, the base station 1 may transmit the system message 102 periodically or in response to update of the random access success rate. Taking an LTE communication system as an example, the system message 102 may be (but is not limited to) a System message Block (SIB) message transmitted on a Physical Downlink Shared Channel (PDSCH), so the wireless device 1 may retrieve the system message 102 from the PDSCH.

In detail, the processor 23 receives the system message 102 from the base station 1. Then the processor 23 divides the preambles into N preamble subsets according to the random access success rate. Each of the N preamble subsets has a part of the preambles. The $i^{th}$ preamble subset includes the $(i-1)^{th}$ preamble subset, where i is a positive integer from 2 to N. The union of the N preamble subsets consists of the preambles.

Once the N preamble subsets are determined, the processor 23 executes a random access initial procedure when the wireless device is to initiate a random access procedure. During the random access initial procedure, the processor 23 randomly selects a preamble from a $j^{th}$ preamble subset, where an initial value of j is 1. Then the processor 13 generates a random access request message (i.e., the random access request message 104 or the random access request message 106 shown in FIG. 1) according to the selected preamble, and transmits the random access request message to the base station 1 via the transceiver 21.

Thereafter, when no random access response message is received from the base station 1 via the transceiver 21 within a preset time, the processor 23 determines whether j is equal to N, and sets j=j+1 if j is not equal to N. Afterwards, the aforesaid steps (i.e, randomly selecting a preamble from a $j^{th}$ preamble subset; generating a random access request message according to the preamble selected; transmitting the random access request message to the base station 1 via the transceiver 21; and when no random access response message is received from the base station 1 via the transceiver 21 within a preset time, determining whether j is equal to N and setting j=j+1 if j is not equal to N;) are repeated by the processor 23 until the random access response message is received from the base station 1 or a number of transmission of the random access request message reaches a threshold value.

On the other hand, the processor 23 executes operations of subsequent stages of the random access procedure when a random access response message is received from the base station 1 via the transceiver 21. It shall be appreciated that, the random access initial procedure refers to a stage of transmitting the random access request message carrying the preambles in the random access procedure. However, because subsequent stages of the random access procedure (e.g., transmitting a Radio Resource Control (RRC) connection request message to the base station in response to the random access response message received from the base station or receiving a Contention Resolution message from the base station) are well known to those of ordinary skill in the art, so they will not be further described herein.

Additionally, the random access success rate set forth in the present invention may be a probability, which is determined statistically by the base station, that an RRC connection request message is successfully received and a Contention Resolution message is successfully transmitted to the wireless device after the base station transmits a random access response message to the wireless device. Furthermore, the random access success rate of the present invention may also be a random access initial procedure success rate (i.e., probability of being free of preamble collision), which is calculated by the base station based on a report of each of the wireless devices regarding the number of transmission of the random access request message in the random access initial procedure before the wireless device successfully receives the random access response message from the base station.

Please refer also to FIG. 1 and FIG. 2 for a second embodiment of the present invention. In this embodiment, the storage further stores a priority value corresponding to an initial preamble number. The processor 23 divides the preambles into N preamble subsets according to the initial preamble number and the random access success rate, where the preamble number of the $1^{st}$ preamble subset is equal to the initial preamble number.

The priority value may be decided by the operator of the mobile communication system MCS when the user applies the communication service for the wireless device and may represent a class of service of the wireless device, e.g., a high priority value or a low priority value. The high priority value corresponds to a high priority initial preamble number, and the low priority value corresponds to a low priority initial preamble number. In other words, the initial preamble number of the wireless device is equal to the high priority initial preamble number when the priority value of the wireless device is the high priority, and is equal to the low priority initial preamble number when the priority value of the wireless device is the low priority.

Usually, a wireless device that needs frequent communication services (e.g., the UE W1) is a high priority wireless device (i.e., a wireless device having a high priority value), while a wireless device that needs only periodical communication services (e.g., the smart meter W2) is a low priority wireless device (i.e., a wireless device having a low priority value). Furthermore, usually the priority value of a wireless device may be determined according to the class of service to which the user applies or the service fee rate. The priority value may be read by the wireless device from a Subscriber Identity Module (SIM) card installed in the wireless device or be written through other software or firmware, and is stored in the wireless device. The wireless device determines whether it is a high priority wireless device or a low priority wireless device by determining whether the priority value thereof is a high priority value or a low priority value.

It shall be appreciated that, the correspondence relationship between the priority value and the initial preamble number may be set by designing the priority value or by a mapping table (not limited thereto) so that the initial preamble number corresponding to the priority value can be known by the wireless device. Therefore, the wireless device may also obtain related information of the correspondence relation between the priority value and the initial preamble number from the system message broadcasted by the base station, or through writing by other software or firmware. Because various representations of the correspondence relationship can be known by those of ordinary skill in the art according to the aforesaid exemplary example, they will not be further described herein.

In this embodiment, the processor 23 multiplies the initial preamble number with a random access success rate to obtain a preamble incremental number of the next preamble subset, as shown in Formula 1 below:

$$INCN=ININ \times SR \quad \text{(Formula 1)}$$

where INCN is the preamble incremental number of the next preamble subset, ININ is the initial preamble number, and SR is the random access success rate.

For example, when the wireless device 2 is the UE W1, the processor 23 determines that the priority value is a high priority value and the corresponding initial preamble number (i.e., the high priority initial preamble number) is 30, and the random access success rate obtained from the base station 1 is 80%. In this case, the $1^{st}$ preamble subset C1 including preambles with serial Nos. of 0-29 can be obtained by the processor 23. Then, the processor 23 multiplies the initial preamble number with the random access success rate (i.e., 80%) to obtain the preamble incremental number of 24 of the next preamble subset (i.e., according to Formula 1).

Then, the $2^{nd}$ preamble subset C2 including preambles with serial Nos. of 0-53 and the $3^{rd}$ preamble subset C3 including preambles with serial Nos. of 0-63 are obtained by the processor 23. It shall be appreciated that, if the preamble number of the previous preamble subset plus the preamble incremental number of the next preamble subset exceeds 64, then the last preamble subset is a preamble subset including preambles with serial Nos. 0-63, and if the initial preamble number multiplied with the random access success rate is not an integer, then the processor 23 rounds off the numerical value (but not limited thereto) to obtain a preamble incremental number of the next preamble subset. Accordingly, the 64 preambles are divided by the processor 23 into 3 preamble subsets (i.e., N=3) as shown in Table 1.

TABLE 1

| Preamble Subset | Preamble Serial No. |
|---|---|
| C1 | 0-29 |
| C2 | 0-53 |
| C3 | 0-63 |

When a random access procedure is initiated by the UE W1, the UE W1 selects a preamble randomly from the preamble subset C1 and generates a random access request message 104 according to the selected preamble. Then, the UE W1 transmits the random access request message 104 to the base station 1. If the preamble in the random access request message 104 collides with a preamble in a random access request message transmitted by any other wireless device, no random access response message will be transmitted by the base station 1 to the UE W1 because the base station 1 cannot detect the preamble in the random access request message 104.

If no random access response message is received from the base station 1 within a preset time, the UE W1 determines whether j is equal to N. Because the initial value of j is 1, the UE W1 sets j=j+1. Then, the UE W1 re-selects a preamble randomly from the preamble subset C2, and generates and transmits the random access request message 104 to the base station 1 according to the re-selected preamble. If preamble collision occurs again, then the UE W1 determines whether j is equal to N again. Because the current value of j is w, the UE W1 sets j=j+1. Next, the UE W1 re-selects a preamble randomly from the preamble subset C3, and generates and transmits the random access request message 104 to the base station 1 again according to the re-selected preamble.

Then if preamble collision occurs anew, the UE W1 keeps j to be 3 instead of setting j=j+1 because the current value of j is 3 which is equal to N. Then, the UE W1 repeats the aforesaid operations until a random access response message is received from the base station 1 or the number of transmission of the random access response message 104 reaches a threshold value. If a random access response message is received from the base station 1 (i.e., no preamble collision occurs this time), then the UE W1 continues to execute subsequent operations of the random access procedure in response to the random access response message.

In another example, if the wireless device 2 is the smart meter W2, then the processor 23 determines that the priority value is a low priority value and has a corresponding initial preamble number (i.e., the low priority initial preamble number) of 20, and the random access success rate obtained from the base station 1 is 80%. In this case, the $1^{st}$ preamble subset B1 including preambles with serial Nos. 0-19 can be obtained by the processor 23. Next, the processor 23 multiplies the initial preamble number with the random access success rate (i.e., 80%) to obtain a preamble incremental number of 16 of the next preamble subset (i.e., according to Formula 1). Then the $2^{nd}$ preamble subset B2 including preambles with serial Nos. 0-35, the $3^{rd}$ preamble subset B3 including preambles with serial Nos. 0-51, and the $4^{th}$ preamble subset including preambles with serial Nos. 0-63 are obtained by the processor 23. Accordingly, the preambles are divided into four preamble subsets (i.e., N=4) by the processor 25, as shown in Table 2.

TABLE 2

| Preamble Subset | Preamble Serial No. |
|---|---|
| B1 | 0-19 |
| B2 | 0-35 |
| B3 | 0-51 |
| B4 | 0-63 |

When a random access procedure is initiated by the smart meter W2, the smart meter W2 selects a preamble randomly from the preamble subset B1 and generates a random access request message 106 according to the selected preamble. Then, the smart meter W2 transmits the random access request message 106 to the base station 1. If the preamble in the random access request message 106 collides with a preamble in a random access request message transmitted by any other wireless device, no random access response message will be transmitted by the base station 1 to the smart meter W2 because the base station 1 cannot detect the preamble in the random access request message 106.

If no random access response message is received from the base station 1 within a preset time, the smart meter W2 determines whether j is equal to N. Because the initial value of j is 1, the smart meter W2 sets j=j+1. Then, the smart meter W2 re-selects a preamble randomly from the preamble subset B2, and generates and transmits the random access request message 106 to the base station 1 according to the re-selected preamble. If preamble collision occurs again, then the smart meter W2 determines whether j is equal to N again. Because the current value of j is 2, the smart meter W2 sets j=j+1. Next, the smart meter W2 re-selects a preamble randomly from the preamble subset B3, and generates and transmits the random access request message 106 to the base station 1 again according to the re-selected preamble.

If preamble collision occurs again, the smart meter W2 determines whether j is equal to N anew. Because the current value of j is 3, the smart meter W2 sets j=j+1. Then, the smart meter W2 re-selects a preamble randomly from the preamble subset B4, and generates and transmits the random access request message 106 to the base station 1 according to the re-selected preamble. Then if preamble collision occurs again, the smart meter W2 keeps j to be 4 instead of setting j=j+1 because the current value of j is 4 which is equal to N.

Thereafter, the smart meter W2 repeats the aforesaid operations until a random access response message is received from the base station 1 or until the number of transmission of the random access response message 106 reaches a threshold value. If a random access response message is received from the base station 1 (i.e., no preamble collision occurs this time), then the smart meter W2 continues to execute subsequent operations of the random access procedure in response to the random access response message.

It can be known from the above description that, according to the random access mechanism of the present invention, wireless devices having different priority values select preambles randomly from different preamble subsets in the random access procedure, so the probability that a wireless device having a high priority value and a wireless device having a low priority value select a same preamble to cause preamble collision can be reduced, thus increasing the success rate of random access requests of wireless devices having a high priority value. Accordingly, the random access mechanism of the present invention divides the preambles into a plurality of preamble subsets by taking the random access success rate into consideration and adopts a code-domain backoff mechanism to reduce the probability of preamble collision.

It shall be appreciated that, other preamble collision mechanisms (e.g., the time-domain backoff mechanism) may be added in the random access mechanism of the present invention in addition to the aforesaid operations. In other words, the wireless device generates a waiting time randomly when no random access response message is received from the base station within a preset time, re-selects a preamble randomly from the next preamble subset only after the waiting time has elapsed, and generates and transmits a random access request message again.

Please refer also to FIG. 1 and FIG. 2 for a third embodiment of the present invention. Unlike the second embodiment, the processor 23 in this embodiment obtains a preamble incremental number of the next preamble subset according to the following Formula 2:

$$INCN=PREN \times SR \qquad \text{(Formula 2)}$$

where INCN is the preamble incremental number of the next preamble subset, PREN is the preamble number of the previous preamble subset, and SR is the random access success rate.

For example, when the wireless device 2 is the UE W1, the processor 23 determines that the priority value is a high priority value and the corresponding initial preamble number (i.e., the high priority initial preamble number) is 30, and the random access success rate obtained from the base station 1 is 80%. In this case, the $1^{st}$ preamble subset C1 including preambles with serial Nos. of 0-29 can be obtained by the processor 23. Then, the processor 23 multiplies the preamble number of the preamble subset C1 (i.e., the preamble number of the previous preamble subset=30) with the random access success rate (i.e., 80%) to obtain the preamble incremental number of 24 of the next preamble subset (i.e., according to Formula 2).

Then, the $2^{nd}$ preamble subset C2 including preambles with serial Nos. of 0-53 is obtained by the processor 23. Next, the processor 23 multiplies the preamble number of the preamble subset C2 (i.e., the preamble number of the previous preamble subset=54) with the random access success rate (i.e., 80%) to obtain the preamble incremental number of 43 of the next preamble subset (i.e., according to Formula 2). Afterwards, the $3^{rd}$ preamble subset C3 including preambles with serial Nos. of 0-63 is obtained by the processor 23.

It shall be appreciated that, if the preamble number of the previous preamble subset plus the preamble incremental number of the next preamble subset exceeds 64, then the last preamble subset is a preamble subset including preambles with serial Nos. 0-63, and if the preamble number of the previous preamble subset multiplied with the random access success rate is not an integer, then the processor 23 rounds off the numerical value (but not limited thereto) to obtain a preamble incremental number of the next preamble subset. Accordingly, the 64 preambles are divided by the processor 23 into 3 preamble subsets (i.e., N=3) as shown in Table 3.

TABLE 3

| Preamble Subset | Preamble Serial No. |
| --- | --- |
| C1 | 0-29 |
| C2 | 0-53 |
| C3 | 0-63 |

As another example, when the wireless device 2 is the smart meter W2, the processor 23 determines that the priority value is a low priority value and the corresponding initial preamble number (i.e., the low priority initial preamble number) is 20, and the random access success rate obtained from the base station 1 is 80%. In this case, the $1^{st}$ preamble subset B1 including preambles with serial Nos. of 0-19 can be obtained by the processor 23. Then, the processor 23 multiplies the preamble number of the preamble subset B1 (i.e., the preamble number of the previous preamble subset=20) with the random access success rate (i.e., 80%) to obtain the preamble incremental number of 16 of the next preamble subset (i.e., according to Formula 2).

Then, the $2^{nd}$ preamble subset B2 including preambles with serial Nos. of 0-35 is obtained by the processor 23.

Next, the processor 23 multiplies the preamble number of the preamble subset B2 (i.e., the preamble number of the previous preamble subset=54) with the random access success rate (i.e., 80%) to obtain the preamble incremental number of 29 of the next preamble subset (i.e., according to Formula 2). Afterwards, the $3^{rd}$ preamble subset B3 including preambles with serial Nos. of 0-63 is obtained by the processor 23. Accordingly, the 64 preambles are divided by the processor 23 into 3 preamble subsets (i.e., N=3) as shown in Table 4.

TABLE 4

| Preamble Subset | Preamble Serial No. |
| --- | --- |
| B1 | 0-19 |
| B2 | 0-35 |
| B3 | 0-63 |

It can be known from the above descriptions that, as compared with the second embodiment, this embodiment enables the preamble incremental number of the next preamble subset to increase rapidly. Because how the random access initial procedure is executed based on the preamble subsets divided in this embodiment can be known by those of ordinary skill in the art from the second embodiment, this will not be further described herein.

Please refer also to FIG. 1 and FIG. 2 for a fourth embodiment of the present invention. Unlike the second embodiment, the processor 23 in this embodiment obtains a preamble incremental number of the next preamble subset according to the following Formula 3:

$$INCN=ININ \times (1+SR) \qquad \text{(Formula 3)}$$

where INCN is the preamble incremental number of the next preamble subset, ININ is the initial preamble number, and SR is the random access success rate.

For example, when the wireless device 2 is the UE W1, the processor 23 determines that the priority value is a high priority value and the corresponding initial preamble number (i.e., the high priority initial preamble number) is 30, and the random access success rate obtained from the base station 1 is 80%. In this case, the $1^{st}$ preamble subset C1 including preambles with serial Nos. of 0-29 can be obtained by the processor 23. Then, the processor 23 multiplies the initial preamble number (i.e., 30) with "1+the random access success rate (i.e., 1+80%)" to obtain the preamble incremental number of 36 of the next preamble subset (i.e., according to Formula 3).

Then, the $2^{nd}$ preamble subset C2 including preambles with serial Nos. of 0-63 is obtained by the processor 23. It shall be appreciated that, if the preamble number of the previous preamble subset plus the preamble incremental number of the next preamble subset exceeds 64, then the last preamble subset is a preamble subset including preambles with serial Nos. 0-63, and if the initial preamble number multiplied with "1+the random access success rate" is not an integer, then the processor 23 rounds off the numerical value (but not limited thereto) to obtain a preamble incremental number of the next preamble subset. Accordingly, the 64 preambles are divided by the processor 23 into 2 preamble subsets (i.e., N=2) as shown in Table 5.

TABLE 5

| Preamble Subset | Preamble Serial No. |
|---|---|
| C1 | 0-29 |
| C2 | 0-63 |

As another example, when the wireless device 2 is the smart meter W2, the processor 23 determines that the priority value is a low priority value and the corresponding initial preamble number (i.e., the low priority initial preamble number) is 20, and the random access success rate obtained from the base station 1 is 80%. In this case, the $1^{st}$ preamble subset B1 including preambles with serial Nos. of 0-19 can be obtained by the processor 23. Then, the processor 23 multiplies the initial preamble number (i.e., 20) with "1+the random access success rate (i.e., 1+80%)" to obtain the preamble incremental number of 36 of the next preamble subset (i.e., according to Formula 3). Then, the $2^{nd}$ preamble subset B2 including preambles with serial Nos. of 0-55 and the $3^{rd}$ preamble subset B3 including preambles with serial Nos. of 0-63 are obtained by the processor 23. Accordingly, the 64 preambles are divided by the processor 23 into 3 preamble subsets (i.e., N=3) as shown in Table 6.

TABLE 6

| Preamble Subset | Preamble Serial No. |
|---|---|
| B1 | 0-19 |
| B2 | 0-55 |
| B3 | 0-63 |

It can be known from the above descriptions that, as compared with the second embodiment, this embodiment enables the preamble incremental number of the next preamble subset to increase rapidly. Because how the random access initial procedure is executed based on the preamble subsets divided in this embodiment can be known by those of ordinary skill in the art from the second embodiment, this will not be further described herein.

Please refer also to FIG. 1 and FIG. 2 for a fifth embodiment of the present invention. Unlike the second embodiment, the processor 23 in this embodiment obtains a preamble incremental number of the next preamble subset according to the following Formula 4:

$$INCN = PREN \times (1+SR) \quad \text{(Formula 4)}$$

where INCN is the preamble incremental number of the next preamble subset, PREN is the preamble number of the previous preamble, and SR is the random access success rate.

For example, when the wireless device 2 is the UE W1, the processor 23 determines that the priority value is a high priority value and the corresponding initial preamble number (i.e., the high priority initial preamble number) is 30, and the random access success rate obtained from the base station 1 is 80%. In this case, the $1^{st}$ preamble subset C1 including preambles with serial Nos. of 0-29 can be obtained by the processor 23. Then, the processor 23 multiplies the preamble number of the preamble subset C1 (i.e., the preamble number of the previous preamble subset=30) with "1+the random access success rate (i.e., 1+80%)" to obtain the preamble incremental number of 36 of the next preamble subset (i.e., according to Formula 4).

Then, the $2^{nd}$ preamble subset C2 including preambles with serial Nos. of 0-63 is obtained by the processor 23. It shall be appreciated that, if the preamble number of the previous preamble subset plus the preamble incremental number of the next preamble subset exceeds 64, then the last preamble subset is a preamble subset including preambles with serial Nos. 0-63, and if the preamble number of the previous preamble multiplied with "1+the random access success rate" is not an integer, then the processor 23 rounds off the numerical value (but not limited thereto) to obtain a preamble incremental number of the next preamble subset. Accordingly, the 64 preambles are divided by the processor 23 into 2 preamble subsets (i.e., N=2) as shown in Table 7.

TABLE 7

| Preamble Subset | Preamble Serial No. |
|---|---|
| C1 | 0-29 |
| C2 | 0-63 |

In another example, when the wireless device 2 is the smart meter W2, the processor 23 determines that the priority value is a low priority value and the corresponding initial preamble number (i.e., the low priority initial preamble number) is 20, and the random access success rate obtained from the base station 1 is 80%. In this case, the $1^{st}$ preamble subset B1 including preambles with serial Nos. of 0-19 can be obtained by the processor 23. Then, the processor 23 multiplies the preamble number of the preamble subset B1 (i.e., the preamble number of the previous preamble subset=20) with "1+the random access success rate (i.e., 1+80%)" to obtain the preamble incremental number of 36 of the next preamble subset (i.e., according to Formula 4). Then, the $2^{nd}$ preamble subset B2 including preambles with serial Nos. of 0-55 is obtained by the processor 23.

Next, the processor 23 multiplies the preamble number of the preamble subset B2 (i.e., the preamble number of the previous preamble subset=56) with "1+the random access success rate (i.e., 1+80%)" to obtain the preamble incremental number of 100 of the next preamble subset (i.e., according to Formula 4). Then, the $3^{rd}$ preamble subset B3 including preambles with serial Nos. of 0-63 is obtained by the processor 23. Accordingly, the 64 preambles are divided by the processor 23 into 3 preamble subsets (i.e., N=3) as shown in Table 8.

TABLE 8

| Preamble Subset | Preamble Serial No. |
|---|---|
| B1 | 0-19 |
| B2 | 0-55 |
| B3 | 0-63 |

It can be known from the above descriptions that, as compared with the second embodiment, this embodiment enables the preamble incremental number of the next preamble subset to increase rapidly. Because how the random access initial procedure is executed based on the preamble subsets divided in this embodiment can be known by those of ordinary skill in the art from the second embodiment, this will not be further described herein.

Please refer also to FIG. 1 and FIG. 2 for a sixth embodiment of the present invention. Unlike the second embodiment, the processor 23 in this embodiment obtains a preamble incremental number of the next preamble subset according to the following Formula 5 when the priority value of the wireless device 2 is a high priority value:

$$INCN = ININ \times \max(SR, FR) \quad \text{(Formula 5)}$$

where INCN is the preamble incremental number of the next preamble subset, ININ is the initial preamble number, SR is the random access success rate and FR is a random access failure rate (i.e., 1-SR, SR+FR=1).

Furthermore, the processor 23 obtains a preamble incremental number of the next preamble subset according to the following Formula 6 when the priority value of the wireless device 2 is a low priority value:

$$INCN=ININ \times min(SR,FR) \quad \text{(Formula 6)}$$

where INCN is the preamble incremental number of the next preamble subset, ININ is the initial preamble number, SR is the random access success rate and FR is a random access failure rate (i.e., 1-SR, SR+FR=1).

For example, when the wireless device 2 is the UE W1, the processor 23 determines that the priority value is a high priority value and the corresponding initial preamble number (i.e., the high priority initial preamble number) is 30, and the random access success rate obtained from the base station 1 is 80% (conversely, the random access failure rate is 20%). In this case, the $1^{st}$ preamble subset C1 including preambles with serial Nos. of 0-29 can be obtained by the processor 23. Then, the processor 23 multiplies the initial preamble number (i.e., 30) with the greatest one of the random access success rate and the random access failure rate (i.e., 80%) to obtain the preamble incremental number of 24 of the next preamble subset (i.e., according to Formula 5).

Then, the $2^{nd}$ preamble subset C2 including preambles with serial Nos. of 0-53 and the $3^{rd}$ preamble subset C3 including preambles with serial Nos. of 0-63 are obtained by the processor 23. It shall be appreciated that, if the preamble number of the previous preamble subset plus the preamble incremental number of the next preamble subset exceeds 64, then the last preamble subset is a preamble subset including preambles with serial Nos. 0-63, and if the initial preamble number multiplied with the greatest one of the random access success rate and the random access failure rate is not an integer, then the processor 23 rounds off the numerical value (but not limited thereto) to obtain a preamble incremental number of the next preamble subset. Accordingly, the 64 preambles are divided by the processor 23 into 3 preamble subsets (i.e., N=3) as shown in Table 9.

TABLE 9

| Preamble Subset | Preamble Serial No. |
| --- | --- |
| C1 | 0-29 |
| C2 | 0-36 |
| C3 | 0-63 |

In another example, when the wireless device 2 is the smart meter W2, the processor 23 determines that the priority value is a low priority value and the corresponding initial preamble number (i.e., the low priority initial preamble number) is 20, and the random access success rate obtained from the base station 1 is 80% (conversely, the random access failure rate is 20%). In this case, the $1^{st}$ preamble subset B1 including preambles with serial Nos. of 0-19 can be obtained by the processor 23. Then, the processor 23 multiplies the initial preamble number (i.e., 20) with the smallest one of the random access success rate and the random access failure rate (i.e., 20%) to obtain the preamble incremental number of 4 of the next preamble subset (i.e., according to Formula 6). Similarly, if the initial preamble number multiplied with the smallest one of the random access success rate and the random access failure rate is not an integer, then the processor 23 rounds off the numerical value (but not limited thereto) to obtain a preamble incremental number of the next preamble subset.

Then, the $2^{nd}$ preamble subset B2 including preambles with serial Nos. of 0-23, the $3^{rd}$ preamble subset B3 including preambles with serial Nos. of 0-27, the $4^{th}$ preamble subset B4 including preambles with serial Nos. of 0-31, the $5^{th}$ preamble subset B5 including preambles with serial Nos. of 0-35, the $6^{th}$ preamble subset B6 including preambles with serial Nos. of 0-39, the $7^{th}$ preamble subset B7 including preambles with serial Nos. of 0-43, the $8^{th}$ preamble subset B8 including preambles with serial Nos. of 0-47, the $9^{th}$ preamble subset B9 including preambles with serial Nos. of 0-51, the $10^{th}$ preamble subset B10 including preambles with serial Nos. of 0-55, the $11^{th}$ preamble subset B11 including preambles with serial Nos. of 0-59, and the $12^{th}$ preamble subset B12 including preambles with serial Nos. of 0-63 are obtained by the processor 23.

Accordingly, the 64 preambles are divided by the processor 23 into 12 preamble subsets (i.e., N=12) as shown in Table 10.

TABLE 10

| Preamble Subset | Preamble Serial No. |
| --- | --- |
| B1 | 0-19 |
| B2 | 0-23 |
| B3 | 0-27 |
| B4 | 0-31 |
| B5 | 0-35 |
| B6 | 0-39 |
| B7 | 0-43 |
| B8 | 0-47 |
| B9 | 0-51 |
| B10 | 0-55 |
| B11 | 0-59 |
| B12 | 0-63 |

It can be known from the above descriptions that, as compared with the second embodiment, this embodiment can ensure that the preamble incremental number of the next preamble subset of a wireless device having a high priority value is greater than the preamble incremental number of the next preamble subset of a wireless device having a low priority value. Because how the random access initial procedure is executed based on the preamble subsets divided in this embodiment can be known by those of ordinary skill in the art from the second embodiment, this will not be further described herein.

Please refer also to FIG. 1 and FIG. 2 for a seventh embodiment of the present invention. Unlike the second embodiment, the processor 23 in this embodiment obtains a preamble incremental number of the next preamble subset according to the following Formula 7 when the priority value of the wireless device 2 is a high priority value:

$$INCN=PREN \times max(SR,FR) \quad \text{(Formula 7)}$$

where INCN is the preamble incremental number of the next preamble subset, PREN is the preamble number of the previous preamble subset, SR is the random access success rate and FR is a random access failure rate (i.e., 1-SR, SR+FR=1).

Furthermore, the processor 23 obtains a preamble incremental number of the next preamble subset according to the following Formula 8 when the priority value of the wireless device 2 is a low priority value:

$$INCN=PREN \times min(SR,FR) \quad \text{(Formula 8)}$$

where INCN is the preamble incremental number of the next preamble subset, PREN is the preamble number of the previous preamble subset, SR is the random access success rate and FR is a random access failure rate (i.e., 1-SR, SR+FR=1).

For example, when the wireless device 2 is the UE W1, the processor 23 determines that the priority value is a high priority value and the corresponding initial preamble number (i.e., the high priority initial preamble number) is 30, and the random access success rate obtained from the base station 1 is 80% (conversely, the random access failure rate is 20%). In this case, the $1^{st}$ preamble subset C1 including preambles with serial Nos. of 0-29 can be obtained by the processor 23. Then, the processor 23 multiplies the preamble number (i.e., the preamble number of the previous preamble subset=30) with the greatest one of the random access success rate and the random access failure rate (i.e., 80%) to obtain the preamble incremental number of 24 of the next preamble subset (i.e., according to Formula 7).

Then, the $2^{nd}$ preamble subset C2 including preambles with serial Nos. of 0-53 is obtained by the processor 23. Next, the processor 23 multiplies the preamble number (i.e., the preamble number of the previous preamble subset=54) with the greatest one of the random access success rate and the random access failure rate (i.e., 80%) to obtain the preamble incremental number of 43 of the next preamble subset (i.e., according to Formula 7). Then, the $3^{rd}$ preamble subset C3 including preambles with serial Nos. of 0-63 is obtained by the processor 23.

It shall be appreciated that, if the preamble number of the previous preamble subset plus the preamble incremental number of the next preamble subset exceeds 64, then the last preamble subset is a preamble subset including preambles with serial Nos. 0-63, and if the preamble number of the previous preamble subset multiplied with the greatest one of the random access success rate and the random access failure rate is not an integer, then the processor 23 rounds off the numerical value (but not limited thereto) to obtain a preamble incremental number of the next preamble subset. Accordingly, the 64 preambles are divided by the processor 23 into 3 preamble subsets (i.e., N=3) as shown in Table 11.

TABLE 11

| Preamble Subset | Preamble Serial No. |
| --- | --- |
| C1 | 0-29 |
| C2 | 0-53 |
| C3 | 0-63 |

As another example, when the wireless device 2 is the smart meter W2, the processor 23 determines that the priority value is a low priority value and the corresponding initial preamble number (i.e., the low priority initial preamble number) is 20, and the random access success rate obtained from the base station 1 is 80% (conversely, the random access failure rate is 20%). In this case, the $1^{st}$ preamble subset B1 including preambles with serial Nos. of 0-19 can be obtained by the processor 23. Then, the processor 23 multiplies the preamble number of the preamble subset B1 (i.e., the preamble number of the previous preamble subset=20) with the smallest one of the random access success rate and the random access failure rate (i.e., 20%) to obtain the preamble incremental number of 4 of the next preamble subset (i.e., according to Formula 8).

Similarly, if the preamble number of the previous preamble subset multiplied with the smallest one of the random access success rate and the random access failure rate is not an integer, then the processor 23 rounds off the numerical value (but not limited thereto) to obtain a preamble incremental number of the next preamble subset. Then, the $2^{nd}$ preamble subset B2 including preambles with serial Nos. of 0-23 is obtained by the processor 23. Next, the processor 23 multiplies the preamble number of the preamble subset B2 (i.e., the preamble number of the previous preamble subset=24) with the smallest one of the random access success rate and the random access failure rate (i.e., 20%) to obtain the preamble incremental number of 5 of the next preamble subset (i.e., according to Formula 8).

Then, the $3^{rd}$ preamble subset B3 including preambles with serial Nos. of 0-28 is obtained by the processor 23. Next, the processor 23 multiplies the preamble number of the preamble subset B3 (i.e., the preamble number of the previous preamble subset=29) with the smallest one of the random access success rate and the random access failure rate (i.e., 20%) to obtain the preamble incremental number of 6 of the next preamble subset (i.e., according to Formula 8). Then, the $4^{th}$ preamble subset B4 including preambles with serial Nos. of 0-34 is obtained by the processor 23. Next, the processor 23 multiplies the preamble number of the preamble subset B4 (i.e., the preamble number of the previous preamble subset=35) with the smallest one of the random access success rate and the random access failure rate (i.e., 20%) to obtain the preamble incremental number of 7 of the next preamble subset (i.e., according to Formula 8).

Then, the $5^{th}$ preamble subset B5 including preambles with serial Nos. of 0-41 is obtained by the processor 23. Next, the processor 23 multiplies the preamble number of the preamble subset B5 (i.e., the preamble number of the previous preamble subset=42) with the smallest one of the random access success rate and the random access failure rate (i.e., 20%) to obtain the preamble incremental number of 8 of the next preamble subset (i.e., according to Formula 8). Then, the $6^{th}$ preamble subset B6 including preambles with serial Nos. of 0-49 is obtained by the processor 23.

Next, the processor 23 multiplies the preamble number of the preamble subset B7 (i.e., the preamble number of the previous preamble subset=50) with the smallest one of the random access success rate and the random access failure rate (i.e., 20%) to obtain the preamble incremental number of 10 of the next preamble subset (i.e., according to Formula 8). Then, the $7^{th}$ preamble subset B7 including preambles with serial Nos. of 0-59 is obtained by the processor 23. Next, the processor 23 multiplies the preamble number of the preamble subset B8 (i.e., the preamble number of the previous preamble subset=60) with the smallest one of the random access success rate and the random access failure rate (i.e., 20%) to obtain the preamble incremental number of 12 of the next preamble subset (i.e., according to Formula 8).

Then, the $8^{th}$ preamble subset B8 including preambles with serial Nos. of 0-63 is obtained by the processor 23. Accordingly, the 64 preambles are divided by the processor 23 into 8 preamble subsets (i.e., N=8) as shown in Table 12.

TABLE 12

| Preamble Subset | Preamble Serial No. |
| --- | --- |
| B1 | 0-19 |
| B2 | 0-23 |
| B3 | 0-28 |
| B4 | 0-34 |

TABLE 12-continued

| Preamble Subset | Preamble Serial No. |
|---|---|
| B5 | 0-41 |
| B6 | 0-49 |
| B7 | 0-59 |
| B8 | 0-63 |

It can be known from the above descriptions that, as compared with the second embodiment, this embodiment can ensure that the preamble incremental number of the next preamble subset of a wireless device having a high priority value is greater than the preamble incremental number of the next preamble subset of a wireless device having a low priority value. Because how the random access initial procedure is executed based on the preamble subsets divided in this embodiment can be known by those of ordinary skill in the art from the second embodiment, this will not be further described herein.

Please refer also to FIG. 1 and FIG. 2 for an eighth embodiment of the present invention. Unlike the second to the seventh embodiments, this embodiment further takes the preamble transmission success rate (which is equal to 1−the preamble collision rate) of the wireless device 2 into consideration, so continuous preamble collision of the wireless device 2 to cause failure of the random access procedure of obtaining transmission resources from the base station 1 can be avoided. Accordingly, in this embodiment, Formula 1 to Formula 8 described above may be modified into Formula 1-1 to Formula 8-1 as follows:

$$INCN = ININ \times SR \times \frac{1}{DPSR} \quad \text{(Formula 1-1)}$$

$$INCN = PREN \times SR \times \frac{1}{DPSR} \quad \text{(Formula 2-1)}$$

$$INCN = ININ \times (1 + SR) \times \frac{1}{DPSR} \quad \text{(Formula 3-1)}$$

$$INCN = PREN \times (1 + SR) \times \frac{1}{DPSR} \quad \text{(Formula 4-1)}$$

$$INCN = ININ \times \max(SR, FR) \times \frac{1}{DPSR} \quad \text{(Formula 5-1)}$$

$$INCN = ININ \times \min(SR, FR) \times \frac{1}{DPSR} \quad \text{(Formula 6-1)}$$

$$INCN = PREN \times \max(SR, FR) \times \frac{1}{DPSR} \quad \text{(Formula 7-1)}$$

$$INCN = PREN \times \min(SR, FR) \times \frac{1}{DPSR} \quad \text{(Formula 8-1)}$$

where INCN is the preamble incremental number of the next preamble subset, ININ is the initial preamble number, PREN is the preamble number of the previous preamble subset, SR is the random access success rate, and W is the weighting value of the wireless device 2.

Because how the preambles are divided into preamble subsets by the wireless device 2 according to these formulas and use the divided preamble subsets to execute the random access initial procedure can be known by those of ordinary skill in the art from the modified formulae, so these will not be further described herein.

Please refer also to FIG. 1 and FIG. 2 for a ninth embodiment of the present invention. Unlike the second to the seventh embodiment, the priority value of the wireless device 2 further corresponds to a weighting value in this embodiment. Accordingly, the high priority value corresponds to a high priority weighting value (e.g., 1.2) and the low priority value corresponds to a low priority weighting value (e.g., 0.8).

In this case, even when the high priority initial preamble number and the low priority initial preamble number are identical to each other (i.e., the initial preamble numbers do not differ from each other due to the different priority values), this embodiment can still ensure that the preamble incremental number of the next preamble subset of a wireless device having a high priority value is greater than the preamble incremental number of the next preamble subset of a wireless device having a low priority value. Accordingly, Formula 1 to Formula 8 described above may be modified into Formula 1-2 to Formula 8-2 as follows:

$$INCN = ININ \times SR \times W \quad \text{(Formula 1-2)}$$

$$INCN = PREN \times SR \times W \quad \text{(Formula 2-2)}$$

$$INCN = ININ \times (1+SR) \times W \quad \text{(Formula 3-2)}$$

$$INCN = PREN \times (1+SR) \times W \quad \text{(Formula 4-2)}$$

$$INCN = ININ \times \max(SR,FR) \times W \quad \text{(Formula 5-2)}$$

$$INCN = ININ \times \min(SR,FR) \times W \quad \text{(Formula 6-2)}$$

$$INCN = PREN \times \max(SR,FR) \times W \quad \text{(Formula 7-2)}$$

$$INCN = PREN \times \min(SR,FR) \times W \quad \text{(Formula 8-2)}$$

where, INCN is the preamble incremental number of the next preamble subset, ININ is the initial preamble number, PREN is the preamble number of the previous preamble subset, SR is the random access success rate, and W is the weighting value of the wireless device 2.

Because how the preambles are divided into preamble subsets by the wireless device 2 according to these formulas and use the divided preamble subsets to execute the random access initial procedure can be known by those of ordinary skill in the art from the modified formulae, so these will not be further described herein.

Figure 3A:
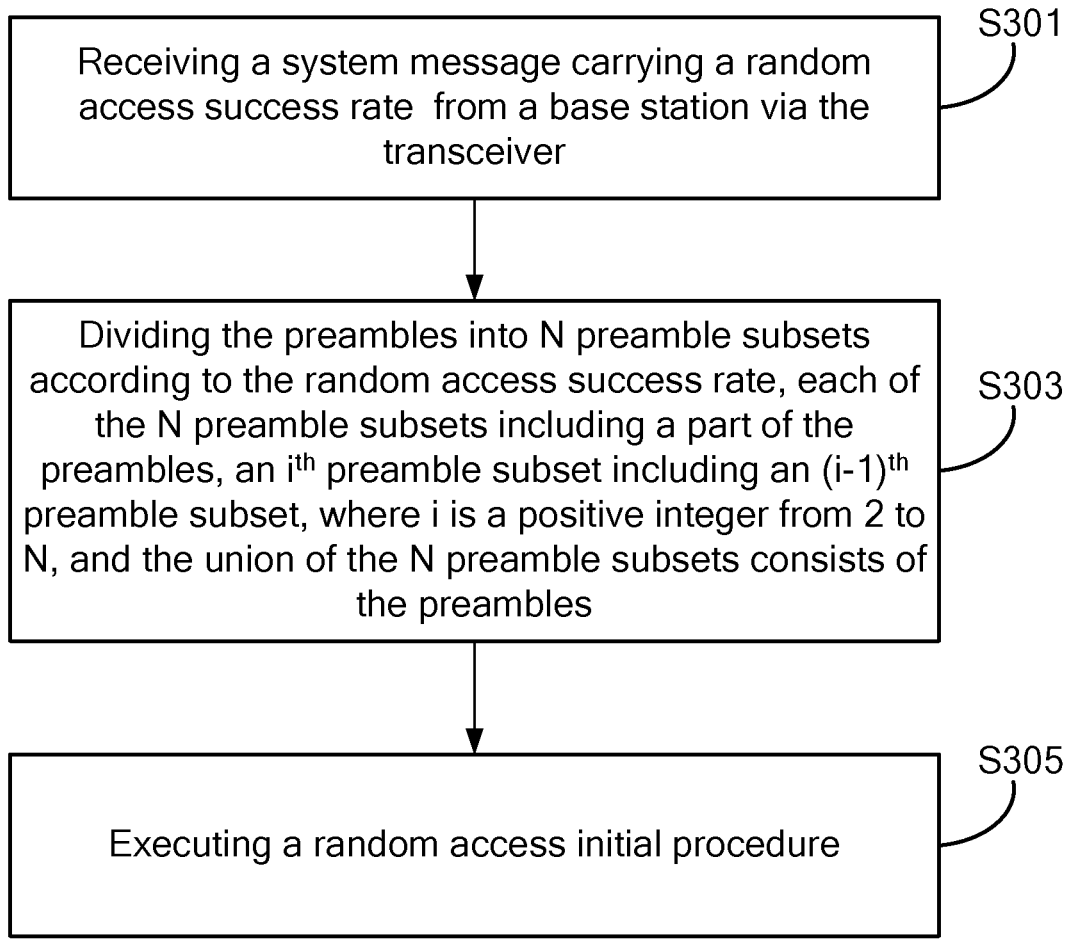
FIGS. 3A-3B are flowchart diagrams of a random access method of the present invention.
Figure 3B:
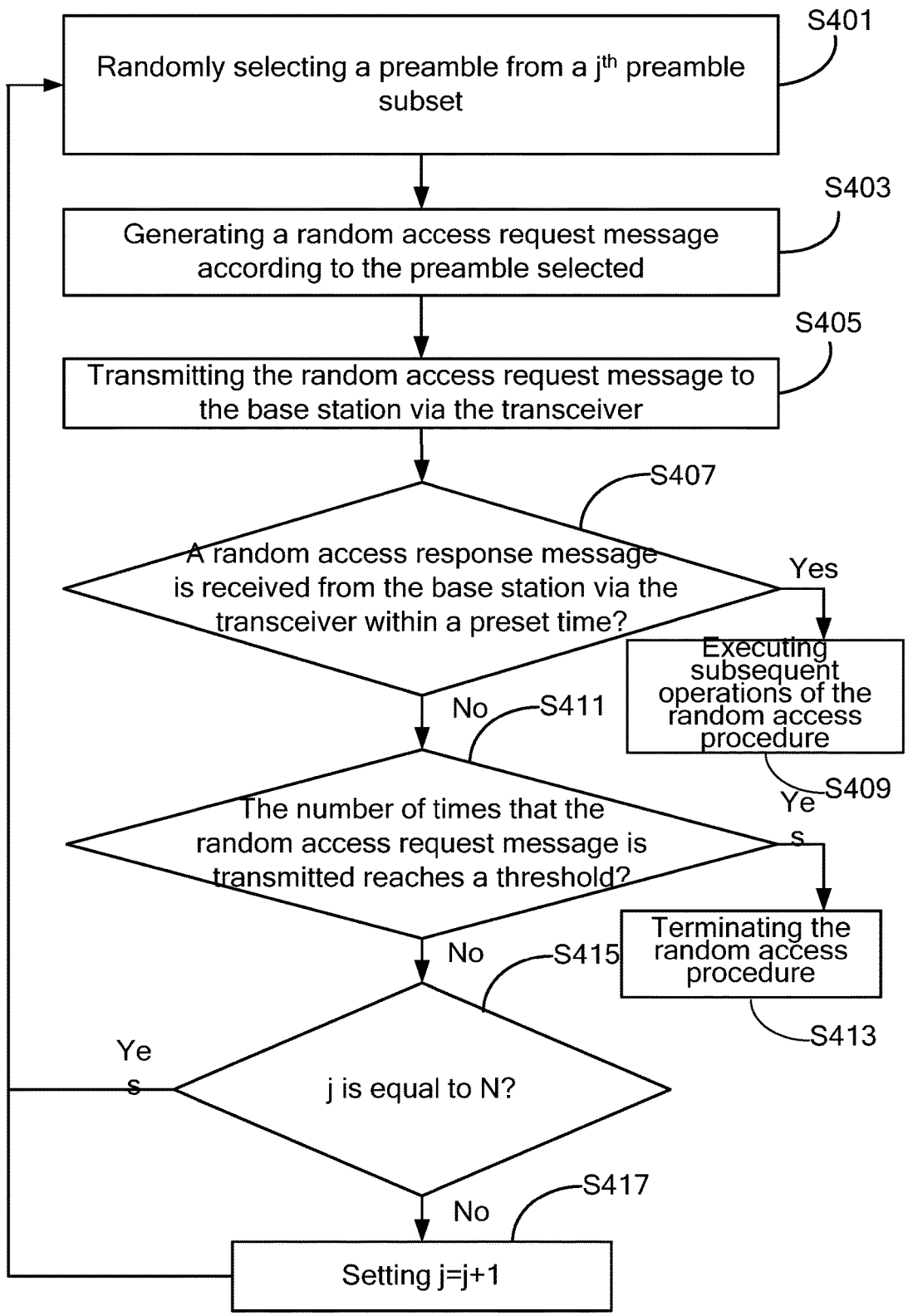

A tenth embodiment of the present invention is shown in FIGS. 3A-3B, which are flowchart diagrams of a random access method of the present invention. The random access method of the present invention is adapted for a wireless device in a mobile communication system (e.g., the wireless device 2 in the aforesaid mobile communication system MCS). The mobile communication system MCS defines a plurality of preambles. The wireless device comprises a transceiver, a processor and a storage. The storage stores the preambles. The random access method is executed by the processor.

First in step S301, a system message carrying a random access success rate is received from a base station and via the transceiver. Then in step S303, the preambles are divided into N preamble subsets according to the random access success rate. Each of the N preamble subsets includes a part of the preambles. The $i^{th}$ preamble subset includes the $(i-1)^{th}$ preamble subset, where i is a positive integer from 2 to N. The union of the N preamble subsets consists of the preambles. Then, when a random access initial procedure is to be executed by the wireless device, step S305 is executed by the wireless device to execute a random access initial procedure. Steps comprised in the random access initial procedure are as shown in FIG. 3B.

First in step S401, a preamble is randomly selected from the $j^{th}$ preamble subset, where an initial value of j is 1. Then in step S403, a random access request message is generated according to the preamble selected. In step S405, the random access request message is transmitted to the base station via the transceiver. Next in step S407, it is determined whether a random access response message is received from the base station via the transceiver within a preset time. If the random access response message is received, then step S409 is executed to execute subsequent operations of the random access procedure.

Conversely, if non random access response message is received from the base station via the transceiver within the preset time, then step S411 is executed to determine whether the number of transmission of the random access request message reaches a threshold. If the number of transmission of the random access request message has reached the threshold, then step S413 is executed to terminate the random access procedure. Otherwise, if the number of transmission of the random access request message has not reached the threshold, then step S415 is executed to determine whether j is equal to N. If j is not equal to N, step S417 is executed to set j=j+1, and the process returns back to the step S401. On the other hand, if j is equal to N, then the process returns directly to the step S401.

In an embodiment, the storage further stores a priority value, the priority value corresponds to an initial preamble number, and the step S303 is executed to divide the preambles into the N preamble subsets according to the initial preamble number and the random access success rate, where a preamble number of the first preamble subset is equal to the initial preamble number.

In an embodiment, the priority value is one of a high priority value and a low priority value. The initial preamble number is equal to a high priority initial preamble number when the priority value is the high priority value and is equal to a low priority initial preamble number when the priority value is the low priority value. Accordingly, the random access method of the present invention may further comprise the following steps of: determining that the priority value is one of the high priority value and the low priority value; and calculating a random access failure rate, a sum of the random access success rate and the random access failure rate being 1. The step S303 is executed to divide the preambles into the N preamble subsets according to the high priority initial preamble number and the greatest one of the random access success rate and the random access failure rate when the priority value is the high priority value, and divides the preambles into the N preamble subsets according to the low priority initial preamble number and the smallest one of the random access success rate and the random access failure rate when the priority value is the low priority value.

In an embodiment, the random access method of the present invention may further comprise the following step of: calculating a preamble transmission success rate and storing the preamble transmission success rate in the storage. Accordingly, the step S303 is executed to divide the preambles into the N preamble subsets according to the initial preamble number, the random access success rate and the preamble transmission success rate.

In an embodiment, the priority value further corresponds to a weighting value, and the step S303 is executed to divide the preambles into the N preamble subsets according to the initial preamble number, the random access success rate and the weighting value. Further, the initial preamble number is equal to a high priority initial preamble number and the weighting value is equal to a high priority weighting value when the priority value is a high priority value; and the initial preamble number is equal to a low priority initial preamble number and the weighting value is equal to a low priority weighting value when the priority value is a low priority value.

Therefore, the random access method of the present invention further comprises the following step of: determining that the priority value is one of the high priority value and the low priority value. The step S303 is executed to divide the preambles into the N preamble subsets according to the high priority weighting value, the high priority initial preamble number and the greatest one of the random access success rate and the random access failure rate when the priority value is the high priority value; and the step S303 is executed to divide the preambles into the N preamble subsets according to the low priority weighting value, the low priority initial preamble number and the smallest one of the random access success rate and the random access failure rate when the priority value is the low priority value.

In other embodiments, the random access method of the present invention may further comprise the following step of: deciding a preamble number of the $i^{th}$ preamble subset according to the initial preamble number, the random access success rate and a preamble number of the $(i-1)^{th}$ preamble subset. Further, when the priority value is one of a high priority value and a low priority value, the random access method of the present invention may further comprise the following steps of: determining a preamble number of the $i^{th}$ preamble subset according to the initial preamble number, the greatest one of the random access success rate and the random access failure rate, and a preamble number of the $(i-1)^{th}$ preamble subset when the priority value is a high priority value; and determining the preamble number of the $i^{th}$ preamble subset according to the initial preamble number, the smallest one of the random access success rate and the random access failure rate, and the preamble number of the $(i-1)^{th}$ preamble subset when the priority value is a low priority value.

In an embodiment, when the priority value is one of a high priority value and a low priority value, the high priority value corresponds to a high priority weighting value and the low priority value corresponds to a low priority weighting value, the random access method further comprises the following steps of: determining that the priority value is one of the high priority value and the low priority value; determining a preamble number of the $i^{th}$ preamble subset according to the high priority weighting value, the initial preamble number, the greatest one of the random access success rate and the random access failure rate, and a preamble number of the $(i-1)^{th}$ preamble subset when the priority value is the high priority value; and determining the preamble number of the $i^{th}$ preamble subset according to the low priority weighting value, the initial preamble number, the smallest one of the random access success rate and the random access failure rate, and the preamble number of the $(i-1)^{th}$ preamble subset when the priority value is the low priority value.

According to the above descriptions, the random access mechanism of the present invention transmits a system message carrying a random access success rate from the base station so that the wireless device divides a plurality of preambles defined by the mobile communication system into a plurality of preamble subsets having a strict partial order relationship therebetween according to the random access success rate. Then in the random access procedure, the wireless device randomly selects a preamble to be used in the random access procedure from a larger preamble subset gradually in response to the preamble collision.

Further in the random access mechanism of the present invention, different priority values are assigned to different kinds of wireless devices, the priority values correspond to different initial preamble numbers or weighting values, and the greatest one or the smallest one of the random access success rate and the random access failure rate is selected according to the priority values so that the preamble incremental number of the preamble subset of a wireless device having a high priority value is greatest than the preamble incremental number of the preamble subset of a wireless device having a low priority value to reduce the probability of preamble collision between the wireless device having the high priority value and the wireless device having the low priority value. Furthermore, the random access mechanism of the present invention takes the preamble transmission success rate of the wireless devices themselves into consideration, so failure to obtain transmission resources from the base station due to continuous preamble collision between the wireless devices can be avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless device for a mobile communication system, the mobile communication system defining a plurality of preambles, the wireless device comprising:
   a transceiver;
   a storage, being configured to store the preambles; and
   a processor electrically connected to the transceiver and the storage, being configured to receive a system message carrying a random access success rate from a base station via the transceiver and divide the preambles into N preamble subsets according to the random access success rate, each of the N preamble subsets including a part of the preambles, an $i^{th}$ preamble subset including an $(i-1)^{th}$ preamble subset, wherein i is a positive integer from 2 to N, and the union of the N preamble subsets consists of the preambles;
   wherein the processor further executes a random access initial procedure which comprises the following steps of:
   (p1) randomly selecting a preamble from a $j^{th}$ preamble subset, wherein an initial value of j is 1;
   (p2) generating a random access request message according to the selected preamble;
   (p3) transmitting the random access request message to the base station via the transceiver;
   (p4) when a random access response message is not received from the base station via the transceiver within a preset time, determining whether j is equal to N, and setting j=j+1 if j is not equal to N; and
   (p5) repeating the steps (p1) to (p4) after the step (p4) until the random access response message is received from the base station or until a number of transmission of the random access request message reaches a threshold value.

2. The wireless device according to claim 1, wherein the storage further stores a priority value, the priority value corresponds to an initial preamble number, and the processor divides the preambles into the N preamble subsets according to the initial preamble number and the random access success rate, wherein a preamble number of the first preamble subset is equal to the initial preamble number.

3. The wireless device according to claim 2, wherein the priority value is one of a high priority value and a low priority value, and the initial preamble number is equal to a high priority initial preamble number when the priority value is the high priority value and is equal to a low priority initial preamble number when the priority value is the low priority value.

4. The wireless device according to claim 3, wherein the processor determines that the priority value is one of the high priority value and the low priority value and calculates a random access failure rate, and a sum of the random access success rate and the random access failure rate is 1;
   wherein the processor divides the preambles into the N preamble subsets according to the high priority initial preamble number and the greatest one of the random access success rate and the random access failure rate when the priority value is the high priority value, and divides the preambles into the N preamble subsets according to the low priority initial preamble number and the smallest one of the random access success rate and the random access failure rate when the priority value is the low priority value.

5. The wireless device according to claim 2, wherein the processor further calculates a preamble transmission success rate and stores the preamble transmission success rate in the storage, and the processor divides the preambles into the N preamble subsets according to the initial preamble number, the random access success rate and the preamble transmission success rate.

6. The wireless device according to claim 2, wherein the priority value further corresponds to a weighting value, and the processor divides the preambles into the N preamble subsets according to the initial preamble number, the random access success rate and the weighting value.

7. The wireless device according to claim 6, wherein the priority value is one of a high priority value and a low priority value, and the initial preamble number is equal to a high priority initial preamble number and the weighting value is equal to a high priority weighting value when the priority value is the high priority value, and the initial preamble number is equal to a low priority initial preamble number and the weighting value is equal to a low priority weighting value when the priority value is the low priority value;

wherein the processor further determines that the priority value is one of the high priority value and the low priority value, and the processor divides the preambles into the N preamble subsets according to the high priority weighting value, the high priority initial preamble number and the greatest one of the random access success rate and the random access failure rate when the priority value is the high priority value, and divides the preambles into the N preamble subsets according to the low priority weighting value, the low priority initial preamble number and the smallest one of the random access success rate and the random access failure rate when the priority value is the low priority value.

8. The wireless device according to claim 2, wherein the processor further decides a preamble number of the $i^{th}$ preamble subset according to the initial preamble number, the random access success rate and a preamble number of the $(i-1)^{th}$ preamble subset.

9. The wireless device according to claim 2, wherein the priority value is one of a high priority value and a low priority value, and the processor further determines that the priority value is one of the high priority value and the low priority value;

wherein the processor further determines a preamble number of the $i^{th}$ preamble subset according to the initial preamble number, the greatest one of the random access success rate and the random access failure rate, and a preamble number of the $(i-1)^{th}$ preamble subset when the priority value is a high priority value, and determines the preamble number of the $i^{th}$ preamble subset according to the initial preamble number, the smallest one of the random access success rate and the random access failure rate, and the preamble number of the $(i-1)^{th}$ preamble subset when the priority value is a low priority value.

10. The wireless device according to claim 2, wherein the priority value is one of a high priority value and a low priority value, the high priority value corresponds to a high priority weighting value and the low priority value corresponds to a low priority weighting value;

wherein the processor further determines that the priority value is one of the high priority value and the low priority value, and the processor further determines a preamble number of the $i^{th}$ preamble subset according to the high priority weighting value, the initial preamble number, a preamble number of the $(i-1)^{th}$ preamble subset and the greatest one of the random access success rate and the random access failure rate when the priority value is the high priority value, and determines the preamble number of the $i^{th}$ preamble subset according to the low priority weighting value, the initial preamble number, the preamble number of the $(i-1)^{th}$ preamble subset and the smallest one of the random access success rate and the random access failure rate when the priority value is the low priority value.

11. A random access method for a wireless device, the wireless device being used in a mobile communication system, the mobile communication system defining a plurality of preambles, the wireless device comprising a transceiver, a storage and a processor, the storage storing the preambles therein, the random access method being executed by the processor and comprising:

(a) receiving a system message carrying a random access success rate from a base station via the transceiver; and (b) dividing the preambles into N preamble subsets according to the random access success rate, each of the N preamble subsets including a part of the preambles, an $i^{th}$ preamble subset including an $(i-1)^{th}$ preamble subset, wherein i is a positive integer from 2 to N, and the union of the N preamble subsets consists of the preambles; and (c) executing a random access initial procedure comprising the following steps of:

(p1) randomly selecting a preamble from a $j^{th}$ preamble subset, wherein an initial value of j is 1;

(p2) generating a random access request message according to the selected preamble;

(p3) transmitting the random access request message to the base station via the transceiver;

(p4) when a random access response message is not received from the base station via the transceiver within a preset time, determining whether j is equal to N, and setting j=j+1 if j is not equal to N; and (p5) repeating the steps (p1) to (p4) after the step (p4) until the random access response message is received from the base station or until a number of transmission of the random access request message reaches a threshold value.

12. The random access method according to claim 11, wherein the storage further stores a priority value, the priority value corresponds to an initial preamble number, and the step (b) includes dividing the preambles into the N preamble subsets according to the initial preamble number and the random access success rate, wherein a preamble number of the first preamble subset is equal to the initial preamble number.

13. The random access method according to claim 12, wherein the priority value is one of a high priority value and a low priority value, and the initial preamble number is equal to a high priority initial preamble number when the priority value is the high priority value and is equal to a low priority initial preamble number when the priority value is the low priority value.

14. The random access method according to claim 13, further comprising:

determining that the priority value is one of the high priority value and the low priority value; and calculating a random access failure rate, a sum of the random access success rate and the random access failure rate being 1;

wherein the step (b) includes dividing the preambles into the N preamble subsets according to the high priority initial preamble number and the greatest one of the random access success rate and the random access failure rate when the priority value is the high priority value, and divides the preambles into the N preamble subsets according to the low priority initial preamble number and the smallest one of the random access success rate and the random access failure rate when the priority value is the low priority value.

15. The random access method according to claim 12, further comprising:

calculating a preamble transmission success rate and storing the preamble transmission success rate in the storage;

wherein the step (b) includes dividing the preambles into the N preamble subsets according to the initial preamble number, the random access success rate and the preamble transmission success rate.

16. The random access method according to claim 12, wherein the priority value further corresponds to a weighting value, and the step (b) includes dividing the preambles into the N preamble subsets according to the initial preamble number, the random access success rate and the weighting value.

17. The random access method according to claim 16, wherein the priority value is one of a high priority value and a low priority value, and the initial preamble number is equal to a high priority initial preamble number and the weighting value is equal to a high priority weighting value when the priority value is the high priority value, and the initial preamble number is equal to a low priority initial preamble number and the weighting value is equal to a low priority weighting value when the priority value is the low priority value, and the random access method further comprises:
  determining that the priority value is one of the high priority value and the low priority value;
  wherein the step (b) includes dividing the preambles into the N preamble subsets according to the high priority weighting value, the high priority initial preamble number and the greatest one of the random access success rate and the random access failure rate when the priority value is the high priority value; and
  wherein the step (b) is dividing the preambles into the N preamble subsets according to the low priority weighting value, the low priority initial preamble number and the smallest one of the random access success rate and the random access failure rate when the priority value is the low priority value.

18. The random access method according to claim 12, further comprising:
  deciding a preamble number of the $i^{th}$ preamble subset according to the initial preamble number, the random access success rate and a preamble number of the $(i-1)^{th}$ preamble subset.

19. The random access method according to claim 12, wherein the priority value is one of a high priority value and a low priority value, and the random access method further comprises:
  determining that the priority value is one of the high priority value and the low priority value;
  determining a preamble number of the $i^{th}$ preamble subset according to the initial preamble number, the greatest one of the random access success rate and the random access failure rate, and a preamble number of the $(i-1)^{th}$ preamble subset when the priority value is a high priority value; and
  determining the preamble number of the $i^{th}$ preamble subset according to the initial preamble number, the smallest one of the random access success rate and the random access failure rate, and the preamble number of the $(i-1)^{th}$ preamble subset when the priority value is a low priority value.

20. The random access method according to claim 12, wherein the priority value is one of a high priority value and a low priority value, the high priority value corresponds to a high priority weighting value and the low priority value corresponds to a low priority weighting value, and the random access method further comprises:
  determining that the priority value is one of the high priority value and the low priority value;
  determining a preamble number of the $i^{th}$ preamble subset according to the high priority weighting value, the initial preamble number, a preamble number of the $(i-1)^{th}$ preamble subset and the greatest one of the random access success rate and the random access failure rate when the priority value is the high priority value; and
  determining the preamble number of the $i^{th}$ preamble subset according to the low priority weighting value, the initial preamble number, the preamble number of the $(i-1)^{th}$ preamble subset and the smallest one of the random access success rate and the random access failure rate when the priority value is the low priority value.

\* \* \* \* \*